Figure 1:
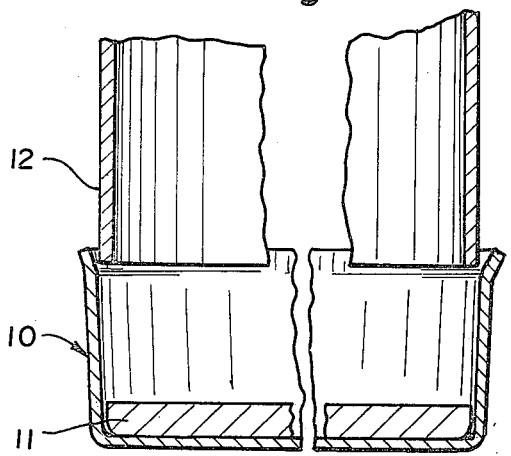

United States Patent [19]
Marsh, Jr.

[11] 3,924,413
[45] Dec. 9, 1975

[54] FITTINGS AND THE LIKE FOR PIPE PILING

[76] Inventor: Richard O. Marsh, Jr., 701 Standard Life Bldg., Pittsburgh, Pa. 15222

[22] Filed: Dec. 4, 1973

[21] Appl. No.: 421,736

[52] U.S. Cl. .................. 61/53; 61/53.5; 138/89; 285/345; 403/305
[51] Int. Cl.² ... E02D 5/00; E02D 5/72; F16L 25/00
[58] Field of Search ........ 61/53, 53.7, 53.5; 175/19; 285/345, 369, 383; 403/305, 300; 138/89, 96; 220/356, 357, 352

[56] References Cited
UNITED STATES PATENTS

| | | | |
|---|---|---|---|
| 865,497 | 9/1907 | Kenyon | 285/345 X |
| 1,805,253 | 5/1931 | Nadel | 61/53 x |
| 2,353,561 | 7/1944 | Hassett | 61/53 X |
| 2,574,648 | 11/1951 | Mason | 403/305 X |
| 2,901,161 | 8/1959 | Henchert | 138/89 X |
| 3,368,830 | 2/1968 | French | 285/345 X |
| 3,543,524 | 12/1970 | Clements | 61/53 |
| 3,724,223 | 4/1973 | Pepe | 61/53 |
| 3,796,057 | 3/1974 | Dougherty | 61/53 |

*Primary Examiner*—Jacob Shapiro
*Attorney, Agent, or Firm*—Buell, Blenko & Ziesenheim

[57] ABSTRACT

The specification discloses fittings for attachment of boot plates or otherwise closing the end of pipe piling and for coupling vertically superimposed sections of pipe piling, which fittings are readily and quickly installed and which provide a seal with the pipe to prevent water from entering the interior of the piling, as by seepage, while the piling is in the ground prior to being filled with concrete. One type of fitting is in the form of a shallow pan, on the bottom of which is a boot plate, and the walls of which have a portion smaller in diameter than the outer diameter of the pipe piling so as to expand thereover and provide a metal-to-metal seal with the piling. Variations of this type are disclosed wherein the bottom of the pan is a disc of heavy gauge metal welded to a circular tapered sleeve of relatively thin gauge. Another type of fitting is in the form of a sleeve having an annular groove formed internally midway of its ends in which is disposed a drive ring of relatively heavy metal having O-ring seals on opposite sides thereof. The pipe piling expands the opposite ends of the coupling in moving inwardly into contact with the drive ring and is sealed by engagement with the O-ring seals. A variation of the latter type of fitting is adapted to couple pipe piling of different diameters.

21 Claims, 11 Drawing Figures

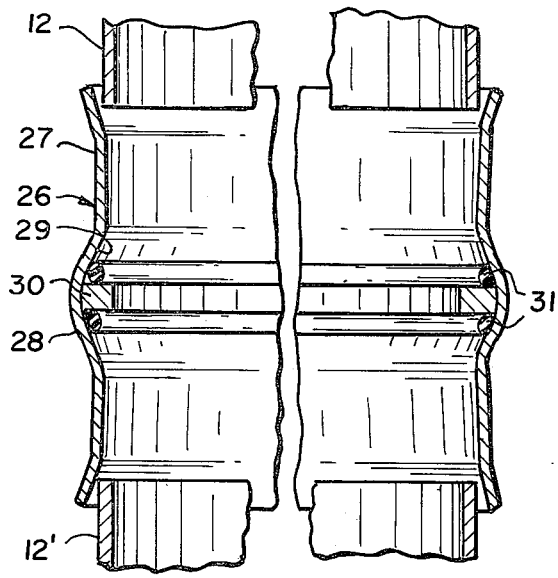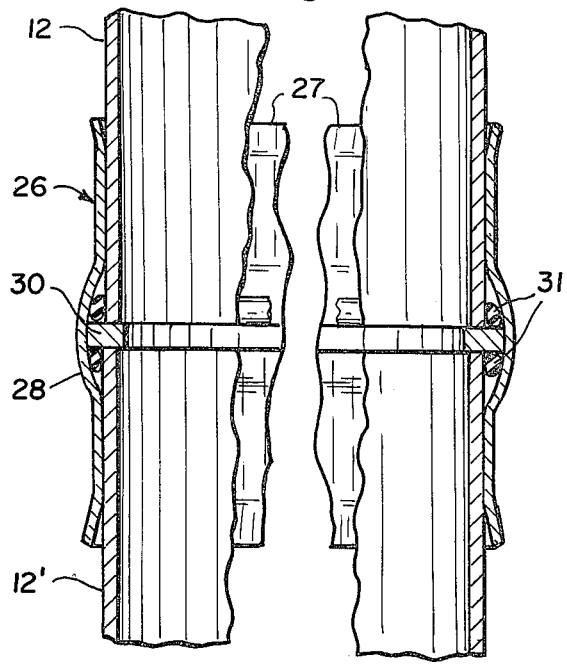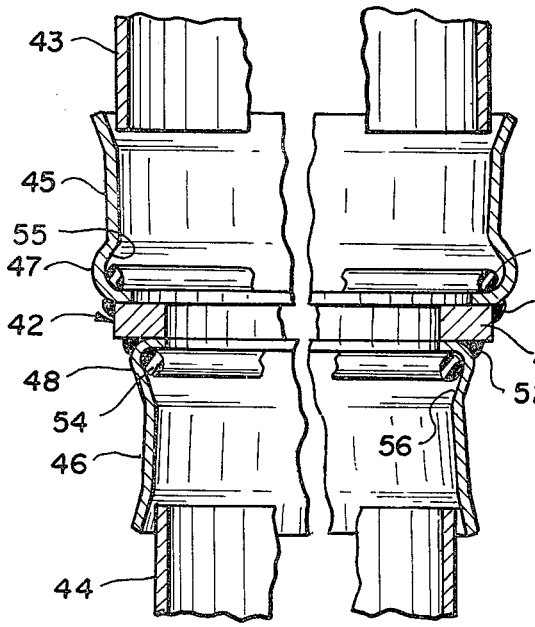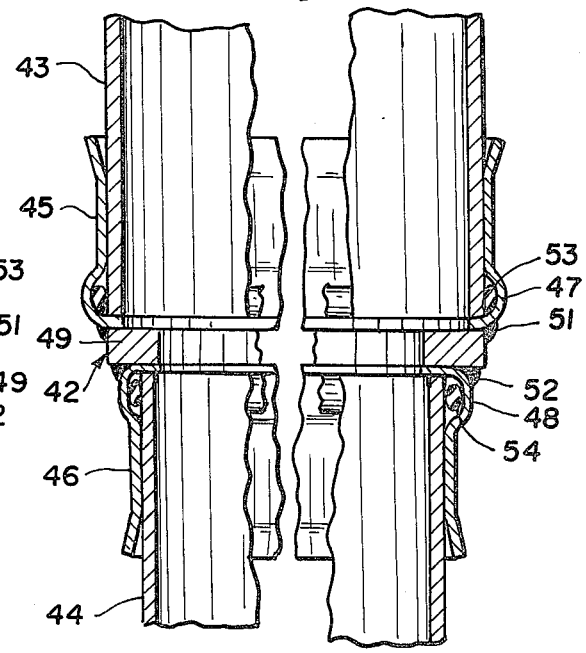

FITTINGS AND THE LIKE FOR PIPE PILING

This invention relates to fittings for attachment to pipe piling by driving the piling thereinto to expand the walls thereof which sealingly grip the piling in metal-to-metal sealing relation. The fittings may be adapted to attach boot plates to the end of pipe piling or to couple superimposed sections of pipe piling.

It is common practice in present day construction operations to drive tubular or pipe pilings for the foundation of bridges and of industrial and commercial buildings. In most cases the pipe piles or piling have closed ends at the driving or bottom end and are fitted with aggregate, such as concrete, after being driven home. The main purposes of the closure of the piles are to provide additional bearing surface and to insure that the interior of the piling remains clean and dry prior to being filled with concrete.

Pipe piles most frequently have diameters ranging from 10 to 16 inches. The closure is most frequently provided by welding a steel disc to the bottom end of the pile. In the range of pile diameters above mentioned, the steel discs or "boot plates" are generally ¾ to 1¼ inches thick and ½ inch larger in diameter than the outside diameter of the pile. The additional diameter provides a ¼ inch annular base for a fillet weld.

In most cases the major pipe mills are not equipped to weld these boot plates on the pile at the mill and thus it becomes necessary to weld them on at the job sites. The operation of welding the boot plates to the piling at the job site under typical job site conditions, is costly and time consuming.

I accordingly propose to provide an alternate, less costly and faster means and method of closing the bottom end of pipe piles.

More particularly, I provide several alternate forms of a shallow pan having a circular wall of lighter gauge metal than the pipe piling and of a diameter tapering slightly inwardly toward the bottom of the pan to a diameter less than that of the pipe pile. Thus as the pipe pile is driven into the pan, the wall of the pan expands by reason of stretching the metal and thereby grips the outer surface of the pipe pile in metal-to-metal sealing relation. A boot plate may be loosely contained in the bottom of the pan or a heavy plate may be welded to the circular side wall of the pan to form the bottom thereof.

It is often necessary to drive pipe piles to greater depths than can be reached with single lengths of pipe pile practical to handle. In such cases, the usual procedure is to drive one length into the ground and then attach or couple a second length to the upper exposed end of the driven pile and continue driving. The second length of pile is usually attached to the first by welding which is expensive and time consuming, or by use of a conventional drive sleeve. The conventional drive sleeve is of fairly heavy gauge metal and is so designed that when the pile is driven into it, the pile is deformed or compressed inwardly. When the pile is heavy wall pipe pile which resists deformation, the drive sleeve which is not designed to expand often breaks or splits open with resulting failure of the pile. In such cases, replacement of the piling is required and is costly. In other cases involving hard driving, the deformation of the pile continues and results in the second pipe pile telescoping into the first or lower pipe pile. The design of the conventional drive sleeve is such that it offers very little resistance to bending, thus often resulting in "dog-legs" which cause rejection of the pile.

I accordingly propose to provide a fitting in the form of a sleeve coupling for pipe piles in which the coupling is of lighter gauge metal than the pipe pile and tapered to a diameter less than the pipe pile itself. Thus, due partly to the thin gauge of the metal wall of the coupling relative to the gauge of the pipe pile wall and partly to the fact that the tensile strength of the metal in the coupling is less than that of the metal of which the piling is made, the sleeve coupling itself is expanded or stretched when the pile is driven into it, rather than deforming the pipe pile as happens with conventional couplings. Accordingly, a water tight metal-to-metal joint is provided in which the pipe pile remains straight sided and transmits the driving impact directly in line with the abutting pipe pile.

I further provide an alternate form of sleeve coupling in which the opposite ends of the coupling are of different diameters to provide a gripping contact with superposed pipe pile of different diameters.

Figure 2:
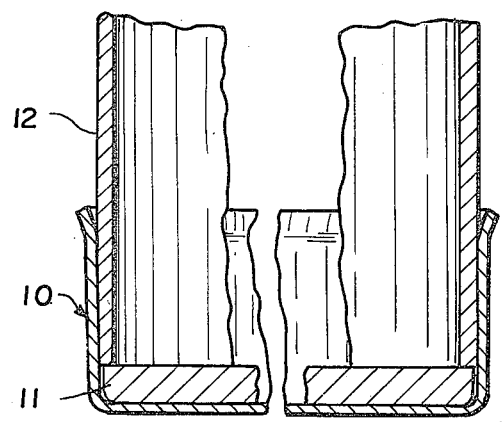
Figure 3:
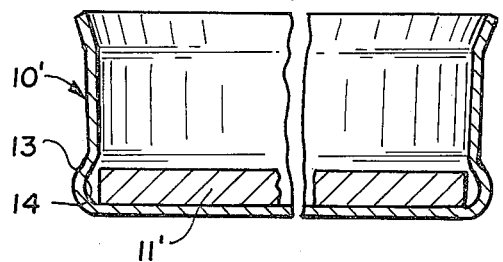
Figure 4:
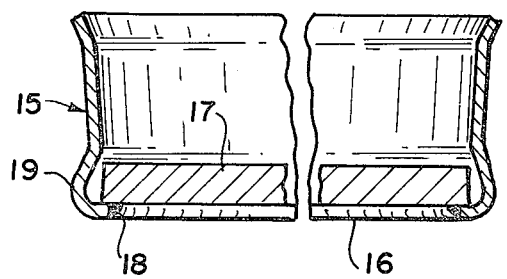
Figure 9:
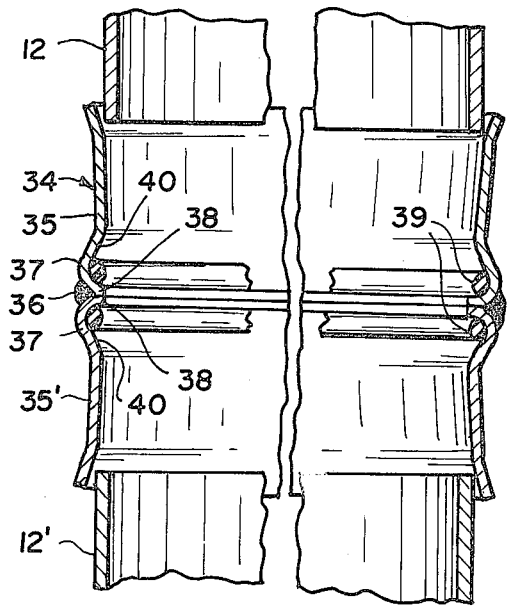
Figure 5:
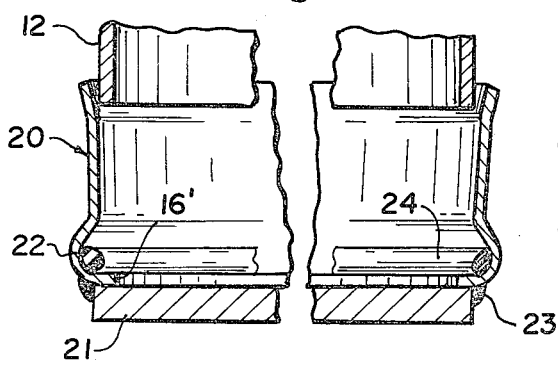
Figure 6:
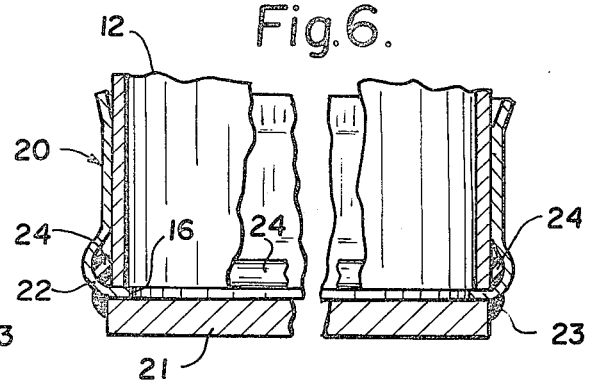

Various embodiments of my invention will be more fully described hereinafter, in connection with the accompanying drawings wherein:

FIG. 1 is a fragmental broken view of one form of expansible fitting for attaching a boot plate to the end of a pipe pile, the parts being shown in their relative positions prior to attachment of the boot plate, FIG. 2 is a fragmental broken view of the expansible fitting of FIG. 1, shown in its installed position attaching the boot plate to the end of the pipe pile, FIG. 3 is a fragmental broken view of a modified form of expansible fitting, FIG. 4 is a fragmental broken view of another form of expansible fitting, FIG. 5 is a fragmental broken view of another form of expansible fitting with a grommet seal, prior to installing on a pipe pile, FIG. 6 is a fragmental broken view of the expansible coupling of FIG. 5 subsequent to installation on pipe pile, FIG. 7 is a fragmental broken view, showing a fitting in the form of a sleeve type of expansible coupling with grommet seals for joining two superposed sections of pipe piles, the parts being shown in their relative positions prior to attachment of the coupling to the pipe piles, FIG. 8 is a fragmental broken view of the expansible coupling of FIG. 7, shown in its installed position coupling the two sections of pipe pile, FIG. 9 is a fragmental broken view of a modified form of expansible coupling utilizing parts of the fittings of FIGS. 4 and 5, in back-to-back relation, and with grommet seals, FIG. 10 is a fragmental broken view of a form of expansible coupling with grommet seals, the opposite ends of which are respectively suited to different diameter pipe pile, prior to installation thereon, and FIG. 11 is a fragmental broken view of the expansible coupling of FIG. 10 subsequent to installation on pipe pile.

Referring to FIGS. 1 and 2 of the drawings, one form of fitting 10 for attaching a circular disc or "boot plate" to a pipe pile 12 is shown, respectively prior to installation and subsequent thererto. The fitting 10 is in the form of a relatively shallow pan of metal, such as steel, the thickness or gauge of which is less than that of the pipe pile 12. Also the steel may have a tensile strength less than that of the pile 12, so that the yield point is lower. The side wall of the fitting is tapered inwardly toward the bottom to a diameter less than the outer diameter of the pipe pile and joins the base through a curved section. The circular disc or boot plate 11, which is of relatively greater thickness than the gauge of the fitting, rests on the bottom or base of the fitting and is slightly less in diameter than the inside diameter of the fitting. The bottom edge of the disc or boot plate is radiused or curved to match the curvature of the section joining the side wall to the base of the fitting. If the bottom edge of the disc or boot plate were not so radiused or curved to match the curvature of the fitting, it is quite likely that, with hard driving of the pile, the disc or boot plate would have a tendency to cut into the fitting and possibly sever the bottom from the fitting. The upper edge of the side wall of the fitting is flared outwardly to aid in easy initial entry of the pipe pile thereinto. The taper of the side wall is such that, notwithstanding tolerance variations, the pipe pile is larger in diameter than the smallest inner diameter of the side wall of the fitting-which thus expands or stretches when forced over the end of the pile. The expansion may or may not exceed the elastic limit of the metal.

It will be seen that attachment of the boot plate 11 to the pipe pile simply involves driving the pipe pile into the fitting or driving the fitting onto the pile, until the pipe pile firmly contacts the boot plate. In this position the side wall of the fitting firmly grips the outer surface of the pipe pile with a metal-to-metal seal.

FIG. 3 shows a fitting 10' different in form to the fitting 10 shown in FIG. 1. In this fitting 10', the curved section joining the side wall of the fitting to the bottom or base thereof bulges outwardly at 13 so as to provide an annular groove 14 inside the fitting adjacent to the bottom. The outwardly bulging section or annular protuberance 13 facilitates the expansion of the side wall as the pipe pile enters the fitting. Also the provision of the annular groove 14 surrounding the disc or boot plate 11' eliminates the necessity for a radius on the lower edge of the disc or plate 11', as provided on the boot plate 11.

In FIG. 4 is shown another form of fitting 15, similar in outward form to that of fitting 10', except for a circular opening 16 at the bottom of the fitting. A circular or disc plate 17 similar to a boot plate and larger in diameter than the opening 16, is placed on the annular shoulder at the bottom of the fitting and secured thereto at 18 along the edge of the circular opening 16, as by welding to provide a water tight seal. The outwardly bulged annular section 19 at the bottom of the fitting serves the same purpose as the outwardly bulged section 13 of the fitting 10', namely it facilitates expansion of the side wall over the pipe pile.

In FIG. 5, another and preferred form of fitting 20 is shown for attachment of a disc 21 to a pipe pile 12.

This form of fitting is similar in appearance to that of fitting 15, but differs therefrom in that the disc 21 is larger in diameter than the opening 16' in the bottom thereof and is secured peripherally to the bulged annular section 22, as by welding at 23. In addition, the fitting 20 is provided with a grommet seal, such as an O-ring 24, which rests snugly within the annular groove formed inside the annular bulged section 22.

As will be seen in FIG. 6, when the fitting 20 is fully installed on the end of the pipe pile 12, not only is the wall of the fitting expanded or stretched to form a metal-to-metal seal with the pipe pile but the compression of the O-ring 24 within the annular groove by the pipe pile provides an additional waterproofing seal to insure that water does not enter the interior of the pipe pile via the flared end of the fitting. This form of fitting 20 is particularly effective in providing a watertight seal, when the pipe pile is of the spiral welded bead type, for in such case the metal-to-metal seal of the fitting on the pipe pile may not be fully effective.

Referring now to FIGS. 7 and 8, there is shown a fitting in the form of a sleeve type coupling 26 which embodies the basic principles of the previously described fittings and which is adapted for the purpose of sealingly coupling two coaxially adjoining sections 12 and 12' of pipe piling of the same diameter. An earlier form of sleeve type coupling for pipe piling is described and claimed in my prior application Ser. No. 149,619, filed June 3, 1971. While similar in general function to that of my prior application, coupling 26 is an improvement thereover. Coupling 26 comprises a sleeve member 27 of metal, such as steel, corresponding in gauge thickness to that of the previously described fittings, that is, less than the gauge of the metal pipe pile 12 and 12'. Also the tensile strength of the metal in sleeve member 27 may be lower than that of the pile 12, 12'. Midway of the ends of the sleeve member is formed an outwardly bulging annular section 28 which provides internally of the sleeve member a shallow annular groove 29. Disposed concentrically within the annular groove 29 is a rigid drive ring 30 of metal, such as steel, having relatively heavy gauge thickness. Any suitable manner of installation of the ring 30 may be employed, such as that described in my prior application Ser. No. 149,169, whereby the expansion of the ring 30 (with or without application of heat) forms the annular groove in the sleeve member. The wall of the sleeve member 27 from the extremities toward the annular bulged section 28 tapers inwardly to a diameter less than the outer diameter of the pipe pile 12 and 12'. Also the outer ends of the sleeve member 27 are flared outwardly to aid in providing entry of the pipe pile into the coupling.

A pair of grommet seals, such as O-rings 31, are disposed on opposite sides respectively of the drive ring 30 within the annular groove 29. The internal diameter of the O-rings 31 is smaller than the smallest internal diameter of the adjacent tapered wall of the sleeve member. Thus, the O-rings 31 are compressed into the groove 29 by the pipe piles 12 and 12' when the pipe piles are driven home into opposite ends of the sleeve member, thereby providing a seal against entry of water into the interior of the pipe pile prior to filling the pile with aggregate, such as cement or concrete.

In use, it will be understood that the coupling 26 is telescoped over the upwardly projecting end of the already driven pile, such as 12' in FIG. 7, until the end of the pile 12' contacts the lower surface of the drive ring 30. The second section of pipe pile, such as 12 in FIG. 7, is then inserted into the upper end of the sleeve member 27 and driven home into contact with the upper surface of the drive ring 30. It will be understood that the tapering sections of the sleeve member 27 are expanded or stretched within or beyond the elastic limit by reason of the larger diameter pipe pile being driven thereinto to provide a metal-to-metal seal therebetween.

While the upper pile section 12 is thus coupled to the lower pile section 12' as seen in FIG. 8, hammer blows may be applied to the upper end of the upper pile section 12 to drive the lower pile section deeper into the ground, the entire drive force being transmitted via the drive ring 30, which is able to withstand the forces applied, without application to the relatively thin-walled sleeve member 27 of the coupling 26.

It will be apparent that as the second pile section follows the first into the ground, the coupling 26 is correspondingly driven into the ground. However, due to the tight metal-to-metal seal of the sleeve member on the pipe pile, as well as the seal effected by the O-rings 31, water cannot enter the interior of the pipe piling. Accordingly the interior of the pipe piling is maintained dry and clean until such time as the aggregate is poured into the open upper end of the piling. Thus the concrete may set and solidify properly without the possibility of damage thereto due to water accumulating within the piling.

FIG. 9 shows another form of sleeve type coupling 34 for coupling two different sections 12 and 12' of pipe pile. Coupling 34 is made by placing two separate and identical sleeve members 35 and 35' back-to-back (or end-to-end) and securing them together, as by a peripheral weld at 36. The sleeve members 35 and 35' individually are closely similar to the fittings 15 and 20 (see FIGS. 4 and 5). In other words, one end of each sleeve member 35 or 35' has an annular protuberance 37 which terminates at an inwardly projecting annular shoulder 38. When the two shoulders are joined in side-by-side relation, they provide the equivalent of a rigid drive ring, such as the drive ring 30 of the foregoing fitting 26.

The sleeve members 35 and 35' are flared outwardly at their outer ends for the same purpose as the sleeve members 27, namely, to assist the pipe pile in entering the coupling. From the flared ends, the sleeve members 35 and 35' taper inwardly to the annular protuberance 37 similarly to and for the same purpose as do the sleeve members 27 of coupling 26.

A pair of grommet seals, such as O-rings 39, are disposed on opposite sides respectively of the annular shoulders 38, within the annular grooves 40 formed internally by the annular protuberances 37.

In use, the coupling 34 functions similarly to the coupling 26 as previously described. Further description of the use of the coupling 34 is accordingly deemed unnecessary.

Referring now to FIGS. 10 and 11, another form of coupling 42 is shown, having two sleeve elements 45 and 46, which is especially suited for coupling two pipe piles 43 and 44 of different diameter. Sleeve elements 45 and 46 are similar to the sleeve members 35, 35' of the coupling 34 in FIG. 9, but are of different diameters, respectively. Each of sleeve elements 45 and 46 has at one end an annular protuberance 47 and 48, respectively, is flared at its outer end and tapers inwardly toward the annular protuberance.

A drive ring 49, of rigid heavy metal such as steel, is interposed between the annular protuberances 47 and 48 and secured, as by welding thereto at 51 and 52.

Grommet seals, such as O-rings 53 and 54, of different diameters, are disposed on opposite sides of the drive ring 49 within the annular grooves 55 and 56, respectively, formed internally of the protuberances 47 and 48.

As seen in FIG. 11, the pipe piles 43 and 44 respectively compress the O-rings 53 and 54 to provide a seal, when the pipe piles are driven home, that is into contact with the lip at the inner extremity of the protuberances 47 and 48.

It will be apparent that while the coupling 42 is depicted as having the larger diameter end uppermost, it may, of course, be employed with the smaller diameter end uppermost. It will also be apparent that other modifications and variations in structure of the fittings and couplings shown and described herein may be made within the terms of the following claims.

I claim:

1. The combination with a section of pipe piling of a fitting attached to said section of pipe piling, said fitting comprising a metal sleeve having a circular section the inner diameter of which tapers to a minimum diameter less than the outer diameter of the pipe piling, said pipe piling being stronger then said circular section whereby the fitting is expanded over the piling without deforming it when the piling is driven thereinto, to provide a watertight metal-to-metal seal on the pipe piling.

2. The combination with a section of metal pipe piling of a fitting attached thereto, said fitting comprising a circular metal sleeve having at one end a flared opening larger in diameter than the outer diameter of the pipe piling, an annular protuberance adjacent the opposite end, and an intervening wall section having an inside diameter smaller than the outer diameter of the pipe piling, said pipe piling being stronger than metal sleeve which expands over the piling when the pipe piling is driven thereinto, said annular protuberance facilitating expansion of the intervening section over the pipe piling to provide a rigid watertight joint therewith without appreciable deformation of the pipe piling.

3. A fitting attachable to the end of a metal pipe pile, said fitting comprising a metal pan-shaped member having a cylindrical side wall with a flared opening at the top and a flat bottom joined to the side wall by a curved wall section, a circular disc resting on the flat bottom and having its lower peripheral edge curved conformably to said curved wall section, a portion of said cylindrical wall tapering to a minimum inside diameter which expands over the pipe pile, as the pile is driven into the fitting into contact with said circular disc to form a watertight joint between the side wall and the pipe pile.

4. A fitting according to claim 3, wherein the cylindrical side wall tapers in diameter from the flared opening to the curved section.

5. A two-piece assembly for attachment to the end of a metal pipe pile, said assembly comprising:
   a. a pan-shaped member having a cylindrical side wall and a flat bottom joined to the side wall by an annular protuberance in the side wall, and
   b. a circular disc resting on the said flat bottom and having a diameter less than that of the interior surface of said annular protuberance, so as to provide clearance therearound,
   the side wall of said pan-shaped member being expanded over the end of the pipe pile to provide a watertight metal-to-metal joint closing the end of the pile when the pile is forced into the pan and into contact with said circular disc.

6. A two-piece assembly according to claim 5, wherein the side wall of the pan-shaped member comprises a conical section tapering inwardly towards said flat bottom to accommodate tolerance variances in the outer diameter of the pipe pile.

7. A fitting for attachment to the end of a metal pipe pile, said fitting comprising:
   a. a circular metal sleeve member having a flared opening at one end and an annular protuberance at its opposite end terminating in an annular inwardly projecting flange, b. a circular disc, and c. means bonding said circular disc to said inwardly projecting flange, the inside diameter of said sleeve member being such that when the pipe pile is inserted into said sleeve member, the sleeve member expands and forms a rigid, watertight attachment of the circular disc to the pipe pile.

8. A fitting according to claim 7, wherein the sleeve member has a conical section between the flared opening and the annular protuberance which tapers inwardly toward said inwardly projecting flange to accommodate tolerance variations in the outer diameter of the pipe pile.

9. A fitting according to claim 7, wherein said circular disc is supported within said sleeve and rests on said inwardly projecting flange.

10. A fitting according to claim 7, wherein said circular disc is disposed outside said inwardly projecting flange.

11. A fitting according to claim 7, wherein said circular disc is disposed outside said inwardly projecting flange and wherein a grommet seal is disposed inside said inwardly projecting flange within the annular groove formed internally of said protuberance, said grommet seal being compressed radially outward by the pipe pile when the pipe pile is forced axially into said sleeve member to provide additional waterproofing to that of the metal-to-metal seal between the said sleeve member and the pipe pile.

12. A coupling for holding two sections of pipe pile in coaxial juxtaposition for driving one pile by the other, said coupling comprising:

a. a circular metallic sleeve member having flared ends and an annular protuberance between the ends forming an annular groove internally of said sleeve member, the flared ends facilitating entry of the pipe pile therein, and the portion of the sleeve member between the flared ends and the annular groove being of such diameter that said portion is expanded over the pipe piling to provide a rigid watertight connection with the pipe piles, and b. a relatively heavy and rigid drive ring expanded into the said annular groove so as to be locked therein, said drive ring having a radial width such as to be engaged on opposite sides by pipe pile when driven into the sleeve member from opposite ends.

13. A coupling for holding two sections of pipe pile in coaxial juxtaposition according to claim 12, wherein the portion of said sleeve member between the flared ends and the annular groove is conical and tapering inwardly toward the annular groove so as to accommodate tolerance variations in the outer diameter of the pipe piling.

14. A coupling for holding two sections of pipe pile in coaxial juxtaposition according to claim 12, wherein a pair of grommet seals are disposed on opposite sides respectively of said drive ring within the said annular groove, said grommet seals being engaged by the pipe pile and sealingly compressed at the juncture of said drive ring and annular groove incidental to the pipe being driven into contact with the drive ring from opposite ends of the sleeve member to provide a watertight connection with the pipe pile in addition to the metal-to-metal seal provided by said sleeve member.

15. A coupling for holding two sections of pipe pile in coaxial juxtaposition for driving one pile by the other, said coupling comprising a pair of identical circular sleeve members, each having a flared opening at one end, an annular inwardly extending flange at the other end, and an annular intervening portion, said sleeve members being disposed coaxially in back-to-back relation with the annular flanges in contact and bonded together, said flared openings being of such a diameter as to assist in entry of the pipe pile into the sleeve members, and the said intervening portions expanding over the pipe pile to provide a metal-to-metal seal therebetween when the pipe pile are driven into said sleeve members and into contact with the respective flanges.

16. A coupling for holding two sections of pipe pile in coaxial juxtaposition according to claim 15, wherein the intervening portions of said sleeve members are conical in nature and taper inwardly toward the flanged ends thereof so as to accommodate tolerance variations in the outer diameter of the pipe pile.

17. The combination with two sections of pipe pile disposed in coaxial juxtaposition of a coupling coaxially joining said pile sections, said coupling comprising:

a. a pair of sleeve members, each having a flared opening at one end, an annular protuberance at the opposite end which terminates in an inwardly extending annular flange and which provides an annular groove internally of the sleeve member, and an intervening annular portion which has a lesser inside diameter and lesser tensile strength than that of the pipe pile, said sleeve members being disposed coaxially in back-to-back relation with the annular flanges in contact, b. means bonding said sleeve members together, and c. a pair of grommet seals disposed on opposite sides respectively of the annular flanges and within the annular grooves formed by said annular protuberances, the pipe piling being sufficiently stronger than the intervening portion of the sleeve members such that the sleeve members expand over the pipe pile to provide a metal-to-metal seal therebetween when the pipe pile are driven into the sleeve members, and said grommet seals being engaged by the pipe pile and compressed within said annular grooves to provide an additional seal with the pipe pile.

18. The combination with two sections of pipe pile of a coupling coaxially joining said pipe pile sections, said coupling comprising:

a. a pair of circular sleeve members, each sleeve member having a flared opening at one end, an annular inwardly extending flange at the other end, and an intervening portion which has an inside diameter less than the outer diameter of a pipe pile section received therein, the pipe pile being stronger than the sleeve members whereby the sleeve members are expanded over the corresponding pipe pile when the latter is driven thereinto to provide a metal-to-metal watertight seal therewith, b. a rigid relatively heavy drive ring interposed between the annular flanges of the said pair of sleeve members when disposed in coaxial relation back-to-back, and c. means bonding said sleeve members to said drive ring.

19. A coupling for holding two sections of pipe pile in coaxial juxtaposition for driving one pile by the other, according to claim 18, wherein said sleeve members are of different diameters, wherein each sleeve member has an internal annular groove adjacent the annular end flange thereof, and wherein a pair of grommet seals of corresponding diameters are disposed in said annular grooves respectively, said grommet seals being engaged and compressed therein by the pipe pile driven into said sleeve members and into contact with said drive ring.

20. The combination with two sections of pipe pile of a coupling holding said pipe pile sections in coaxial juxtaposition for enabling one section of pile to be driven by the other, said coupling comprising a circular sleeve member the opposite ends of which are flared to assist in entry of the pipe pile into the coupling, a rigid collar fixed to said sleeve member and so intervening between the ends thereof as to be engageable by the ends of pipe pile driven into opposite ends of said sleeve member, the portions of said sleeve member intervening between said rigid collar and the flared ends thereof having an inside diameter less than the outer diameter of the pipe pile and a gauge thickness and strength less than that pile, so that said coupling expands over the pipe pile and provides a metal-to-metal watertight seal therebetween.

21. The combination according to claim 20, wherein the portions of said sleeve member intervening between the rigid collar and the flared ends are conically tapered uniformly toward said rigid collar.

* * * * *